United States Patent [19]
Topol et al.

[11] 3,719,611
[45] March 6, 1973

[54] SYNTHESIS OF IONICALLY CONDUCTIVE COMPOSITIONS OF MATTER USING AMINE SOLVENTS

[75] Inventors: Leo E. Topol; Herman Mandel, both of Canoga Park, Calif.

[73] Assignee: North American Rockwell Corporation, El Segundo, Calif.

[22] Filed: Dec. 8, 1970

[21] Appl. No.: 96,226

[52] U.S. Cl. ................................. 252/518, 423/463
[51] Int. Cl. ............................................. H01b 1/02
[58] Field of Search .............. 252/518; 23/87, 89, 367

[56] References Cited

UNITED STATES PATENTS

| 3,519,404 | 7/1970 | Argue et al. | 252/518 |
| 2,994,975 | 7/1960 | Folberth | 23/204 |
| 2,944,975 | 7/1960 | Folberth | 23/204 |

OTHER PUBLICATIONS

Jacobson Encyclopedia of Chemical Reactions Vol. VI 1956, p. 162.

Primary Examiner—George F. Lesmes
Assistant Examiner—J. P. Brammer
Attorney—L. Lee Humphries, Thomas S. MacDonald and Henry Kolin

[57] ABSTRACT

A process for the preparation of a solid ionically conductive composition of matter of either the formula:

1. $MAg_4I_5$ in which M is Rb, K, $NH_4$, Cs, or combinations thereof, Cs being present only as a minor constituent of M; or 2. $QAg_nI_{n+1}$, where $n$ has a value from 3 to 39 inclusive and Q is an organic ammonium cation having an ionic volume between 30 and 85 cubic angstroms, comprising reacting approximately stoichiometric quantities, corresponding to the ionically conductive compositions formed, of AgI and either MI or QI in a liquid reaction medium that is a water-containing selected amine solvent, and separating the synthesize ionically conductive composition from the reaction medium.

10 Claims, No Drawings

SYNTHESIS OF IONICALLY CONDUCTIVE COMPOSITIONS OF MATTER USING AMINE SOLVENTS

BACKGROUND OF THE INVENTION

This invention relates to a process for the preparation of ionically conductive compositions of matter having unusually high ionic conductivity. It particularly relates to a process for the preparation of compounds having the formula $MAg_4I_5$ in which M is Rb, $NH_4$, K, Cs, or a combination of these, Cs being present only as a minor constituent of M; and $2 QAg_nI_{n+1}$, where $n$ has a value from 3 to 39 inclusive and Q is an organic ammonium cation having an ionic volume between 30 and 85 cubic angstroms. Such compositions are particularly useful as electrolytes in solid state electric cells. Electric cells containing these electrolyte materials are described in U. S. Pat. Nos. 3,443,997 and 3,476,606, respectively.

Compositions of the foregoing type, $MAg_4I_5$ and $QAg_nI_{n+1}$ have recently been shown to have high ionic conductivity in the solid state over a wide range of temperatures. The known methods of preparing these compositions involve mixing appropriate amounts of the solid reactants MI and AgI or QI and AgI in the desired molar ratios, and either heating the mixture until molten, followed by a holding period at a lower temperature to form the desired compound (melt-anneal technique), or reacting the solid reactants in a time-consuming solid-state reaction at an annealing temperature of 200°C or higher to form the compound. In an alternative method of preparation of $MAg_4I_5$, the constituents are dissolved in acetone and precipitated by evaporation. However, this method results in a mixture of the desired compound and another compound, generally of high resistivity, rather than the pure ionically conductive composition. For preparing the organic silver ammonium iodide compositions, $QAg_nI_{n+1}$, a paste preparation technique has also been used in which a slurry or paste is prepared of the silver iodide and the organic ammonium iodide, followed by a multiple annealing technique. Synthesis in an aqueous medium in which the silver iodide and organic ammonium iodide reactants and the formed product exhibit only a limited solubility has also been suggested as feasible.

The present invention provides a simple and convenient method for the preparation of solid ionically conductive materials from selected organic amine solutions. The process of this invention is advantageous compared with the methods known to the prior art in that it is more easily adapted to large-scale production, provides for control or variation of the composition of the materials formed, and may be used to produce large crystals or thin films of the desired compound. The present process does not require the use of a high temperature, and the synthesized compositions may be easily recovered from the reaction medium.

The compositions prepared by the process of this invention have a high ionic conductivity and may be used in a variety of electrochemical devices. The process is of particular utility for preparing compositions for use in thin-film and single-crystal devices.

SUMMARY OF THE INVENTION

The solid ionically conductive compositions which may be prepared by the process of this invention have either the general formula:

1. $MAg_4I_5$ in which M is Rb, K, $NH_4$, Cs, or combinations thereof, Cs being present only as a minor constituent of M; or
2. $QAg_nI_{n+1}$ where $n$ has a value from 3 to 39 inclusive and Q is an organic ammonium cation having an ionic volume between 30 and 85 cubic angstroms.

According to the process of this invention, AgI and a compound MI or QI (M and Q as above defined) are reacted in approximately stoichiometric amounts, corresponding to the ratios of the compositions formed, in a selected liquid reaction medium which is a water-containing amine solution.

The organic amine serves to solubilize the silver iodide, with which it forms a soluble complex; the water present serves to solubilize the MI or QI compound. While both the AgI and MI or QI may be added directly to the amine solution and containing a small amount of water, in the preferred aspects of practicing the invention the AgI is separately dissolved in a small amount of the organic amine, and MI or QI is separately dissolved in a minimum quantity of water sufficient to solubilize it. Then one liquid solution is added to the other. Generally the final amine solution will contain from 1 to 3 volume percent of water.

Suitable organic amines are those which readily dissolve or solubilize the silver iodide, are liquid at the reaction temperature and miscible with at least small amounts of water, and are volatilized below the decomposition temperature of the ionically conductive composition. Thus utilizable amines are generally selected from those having a boiling range between 30° and 200°C, preferably between 50° and 150°C. Because amines readily form a complex with silver salts, thereby solubilizing them, the selection of the organic amine to be utilized in the practice of this invention is not considered critical and may be readily determined within the requirements above set forth. Many commercially available amines are known and are utilizable in the practice of the present invention. They are conveniently classified as alkylamines, ethylene amines, alkanolamines, and arylamines, and include primary, secondary, and tertiary amines. Generally those liquid amines of low molecular weight, e.g., between 50 and 100, which are readily commercially available as inexpensive solvents are preferred. Illustrative of suitable alkylamines are diethylamine, triethylamine, n-propylamine, di-n-propylamine, di-isopropylamine, n-butylamine, n-dibutylamine, isobutylamine, diisobutylamine, sec-butylamine, n-amylamine, sec-amylamine, sec-hexylamine, 2-ethylbutylamine, n-heptylamine, and 2-ethylhexylamine. Suitable alkylene diamines include ethylenediamine and propylenediamine. Suitable arylamines include aniline, dimethylaniline, cyclohexylamine, pyridine, 2,4-lutidine, 2,6-lutidene, alpha-picoline, beta-picoline, and gamma-picoline. Suitable alkanolamines include monoethanolamine, 2-amino-2-methyl-1-propanol, 2-amino-2-methyl-1,3-propanediol, 2-amino-2-ethyl-1,3-propanediol, 2-amino-butanol, ethyl monoethanolamine, dimethylethanolamine, and diethylethanolamine. Other suitable amines include allylamine, morpholine, N-ethyl morpholine, and hexamethylenimine. In general, the simple hydrocarbon-substituted amines are particularly preferred solvents because of their ready commercial availability, ease in handling, and low boiling points. Illustrative of such preferred amine solvents are pyridine, allylamine, diethylamine, and ethylenediamine. After reaction, the synthesized compositions are recovered from the reaction medium by precipitation, either by adding an additional component to reduce the solubility of the composition or by evaporating the solvent away.

DESCRIPTION OF THE PREFERRED EMBODIMENTS

In the practice of the process of the present invention in its preferred aspects, the appropriate amount of silver iodide is dissolved in the selected liquid organic amine, which has been warmed to at least room temperature, preferably between 50° and 100°C, to form a concentrated solution. The appropriate amount of the second iodide, MI or QI or combination of iodides, is then added, preferably as an aqueous solution in a minimal amount of water. The amount of water utilized is not considered critical, but no advantages are obtained by using excess amounts of water and such use is disadvantageous because of the requirements for the subsequent removal of the solvents to recover the formed compound. Thus, while the water present in the amine solution may be as high as 10 volume percent or greater, generally it will be present in an amount not greater than between 1 and 3 volume percent. Because of the subsequent need for separating the ionically conductive composition from the reaction medium, it is preferred that both the initial amine solution and the initial aqueous solution be prepared as concentrated solutions so as to minimize the quantities of solvent required to be volatilized. The relative stoichiometric amount of the second iodide to be added to the silver iodide is determined by the composition of the ionically conductive compound to be prepared. For example, to form a composition $RbAg_4I_5$, the components are used in a ratio of $4AgI:RbI$.

In preparing the alkali metal silver iodides, the second iodide may be rubidium iodide, potassium iodide, ammonium iodide, cesium iodide or combinations thereof. Cesium iodide where used constitutes less than 50 percent by weight of the second iodide and is present only in combination with one or more of the other alkali metal iodides.

To prepare the organically substituted ammonium silver iodides, the organic ammonium iodide components and the molar ratios used are essentially as described in U.S. Pat. No. 3,476,606, particularly as set forth in Column 3 thereof. Thus $n$ moles of AgI will be reacted with each mole of QI to give the organic ammonium silver iodide compound having the formula $QAg_nI_{n+1}$ where $n$ has any value between 3 and 39. Preferably, 4 to 9 molar portions of silver iodide are reacted with each molar portion of QI. For example, to prepare a preferred compound, 6½ moles of AgI are reacted with 1 mole of $NR_4I$, where R is preferably a lower alkyl group such as methyl, ethyl, propyl, or butyl. While pyridine, allylamine, diethylamine, and ethylenediamine have been found to be especially useful amine solvents, their use is not critical and other amines may be used in the practice of this invention as above set forth.

The process may be carried out at any suitable temperature which is below the boiling point of the liquid reaction medium, for example, from slightly above room temperature to about 150°C. Preferably the temperature is above 50°C. The synthesized compositions are easily recovered from the reaction medium.

Recovery from the single-phase reaction medium solution may be made in either of two ways. In the first method, after a single-phase reaction medium is obtained, the reaction medium is then evaporated to dryness. The solid which remains is the ionically conductive material. This is dried by heating it at a temperature of about 50°–150°C for 0.5 to 5 hours.

In another method, after a single-phase reaction medium is obtained, the ionically conductive composition is separated as a solid by extraction from the reaction medium with an alcohol at room temperature or preferably warmed, e.g., 40°–60°C. To the reaction medium containing the synthesized ionically conductive composition, an approximately equal volume of warm lower alkyl alcohol is added. The mixture is stirred briefly and allowed to separate into layers. The upper alcohol layer contains a white solid; this alcohol layer is separated from the reaction medium, for example, by decanting and filtering the alcohol while warm or by other suitable methods. After removal of the alcohol, the residue, which is the solid ionically conductive composition, is dried, for example, by heating at 50°–150°C for about 0.5 to 5 hours. Ethanol and isopropyl alcohol are especially useful for extracting the ionically conductive composition in this second method. In using this method, care must be taken to avoid the use of excess amounts of alcohol since this may result in precipitation of small amounts of AgI from the reaction medium, thereby contaminating the ionically conductive composition.

With either of the methods described above, a purer product may be obtained by washing the precipitate with a dry lower alkyl alcohol; or fractional crystallization may be employed, using the amine solvent and a lower alkyl alcohol. In this manner, any alcohol-soluble compounds that may have coprecipitated with the ionically conductive composition, or any amine solvent still remaining with the composition, can more effectively be removed.

The present process is especially useful for preparing ionically conductive compositions of matter for use in thin-film and single-crystal electrochemical devices. By suitable control of the conditions of precipitation and evaporation, thin films or large single crystals of the compositions may be produced in a relatively simple manner, since removal of the solvent by evaporation leaves the compound behind.

The following examples serve to illustrate the invention, but are in no way considered limiting thereto:

EXAMPLE 1

6.5 g. AgI was dissolved in 30 ml. pyridine at 60°C. To this solution was added 1.5 g. RbI dissolved in 0.8 ml. water. After obtaining a single-phase solution, the resulting solution was evaporated to dryness on a hot plate, and the residue was then dried in an oven at 120°C for three-fourths hour. The material formed was essentially $RbAg_4I_5$, as shown by X-ray and conductivity measurements.

EXAMPLE 2

The process of Example 1 was followed, except that after obtaining a single-phase solution, 30 ml. isopropyl alcohol which had been warmed to 50°C was added to the solution and stirred briefly. After standing for 1 to 2 minutes, the mixture separated into two layers, with the upper alcohol layer containing a white solid. The upper layer was separated, decanted, and filtered. A white residue was recovered, which was dried at 110°C for an hour. This residue was found to be essentially $RbAg_4I_5$ by X-ray and conductivity tests.

EXAMPLE 3

2.85 g. AgI was dissolved in 30 ml. pyridine. To this solution was added 0.5 g. KI dissolved in 0.5 ml. water. The solution was stirred and then evaporated to dryness in an oven at a temperature of about 120°C. The material formed was essentially $KAg_4I_5$ as shown by X-ray and conductivity measurement.

EXAMPLE 4

$N(C_2H_5)_4I.6\frac{1}{2}AgI$ was prepared following the general procedure shown in Example 3. 5.59 g. AgI + 1.0 g. $N(C_2H_5)_4I$ in 25 ml. pyridine plus 0.5 ml. water were used. A clear solution was obtained. The solution was stirred and then evaporated to dryness in an oven at a temperature of about 120°C. The material formed was essentially $N(C_2H_5)_4I.b\frac{1}{2}AgI$ as shown by X-ray and conductivity measurements.

EXAMPLE 5

$RbAg_4I_5$ was prepared from an allylamine solution following the general procedure shown in Example 3. 1.62 g. AgI was dissolved in 15 ml. allylamine, and this solution was reacted with 0.37 g. RbI in 1 ml. water. The solution was stirred and then evaporated to dryness in an oven at a temperature of about 120°C. The material formed was essentially $RbAg_4I_5$ as shown by X-ray and conductivity measurements.

EXAMPLE 6

Example 5 was repeated, except that after obtaining a single-phase solution, 40 ml. ethanol was added to the solution which was warmed to 50°C. The solution was stirred and then allowed to stand for several minutes. The mixture separated into two layers, the upper alcohol layer containing a white solid. This upper layer was separated, decanted, and filtered. The recovered residue was essentially $RbAg_4I_5$ as shown by X-ray and conductivity measurements.

In an alternative procedure, isopropyl alcohol was utilized in place of ethanol. $RbAg_4I_5$ was similarly recovered.

EXAMPLE 7

To 25 ml. diethylamine was added 1.62 g. AgI and 1 ml. water containing 0.37 g. RbI dissolved therein. The resultant solution was evaporated on a hot plate, and then dried for 2 hours in a 140°C over. The material formed was essentially $RbAg_4I_5$ as shown by x-ray and conductivity measurements.

EXAMPLE 8

1.62 g. AgI was dissolved in 20 ml. ethylenediamine. To this was added 0.37 g. RbI in 1 ml. water. The single-phase solution obtained was evaporated down on a hot plate, and the obtained residue was dried in a 150°C oven for 2 hours. The material formed was essentially $RbAg_4I_5$ as shown by x-ray and conductivity measurements.

Compounds made according to the process of this invention are prepared combining stoichiometric proportions corresponding to 4AgI:MI or nAgI:QI, e.g., $RbAg_4I_5$ or $6\frac{1}{2}AgI:N(C_2H_5)_4I$. However, small amounts of the starting compounds or of adventitious impurities which may be present will not unduly decrease the ionic conductivity values. Further, certain inorganic compounds such as silica as well as organic polymers and other additives may be inclined with the pure compounds for purposes of moisture absorption, stability, etc.

It will of course be realized that various modifications can be made in the design and operation of the present invention without departing from the spirit thereof. Thus, while the principle, preferred construction, and mode of operation of the invention have been explained and what is now considered to represent its best embodiment has been illustrated and described, it should be understood that within the scope of the appended claims the invention may be practiced otherwise than as specifically illustrated and described.

We claim:

1. A process for preparing a solid ionically conductive composition of matter of the general formula: (1) $MAg_4I_5$ where M is Rb, K, $NH_4$, Cs, or combinations thereof, Cs being present only in combination as a minor constituent of M; or (2) $QAg_nI_{n+1}$ where $n$ has a value from 3 to 39 inclusive and Q is an organic ammonium cation having an ionic volume between 30 and 85 cubic angstroms; which process comprises the steps of (a) reacting silver iodide with a second iodide compound selected from MI and QI in a single-phase liquid reaction medium which is a water-containing amine solution, the second iodide compound and silver iodide being present in the reaction medium is about stoichiometric amounts, corresponding to the ionically conductive composition prepared, and (b) separating the so-prepared solid ionically conductive composition of matter from the reaction medium.

2. The process according to claim 1 wherein the second iodide compound is added in the form of an aqueous solution to the amine which contains the AgI.

3. The process according to claim 1 wherein the single-phase reaction medium contains between 1 and 3 volume percent water.

4. The process according to claim 1 wherein the temperature of the reaction medium is between about 50 and 150°C.

5. The process according to claim 1 wherein the amine is selected from the group consisting of pyridine, allylamine, diethylamine, and ethylenediamine.

6. The process according to claim 1 wherein step (b) comprises evaporating the reaction medium to dryness and drying the remaining solid ionically conductive compound thereby separating the ionically conductive composition from the reaction medium.

7. The process according to claim 1 wherein step (b) comprises adding a lower alkyl alcohol to the reaction medium containing the ionically conductive composition, stirring, separating the reaction medium into an upper alcohol layer containing the ionically conductive composition and a lower amine layer, and recovering the ionically conductive composition from the alcohol layer.

8. The process according to claim 7 wherein the lower alkyl alcohol is selected from ethanol and isopropyl alcohol.

9. The process according to claim 1 wherein M is Rb and the formed solid ionically conductive composition is $RbAg_4I_5$.

10. The process according to claim 1 wherein an organic ammonium silver iodide composition is prepared by reacting from 4 to 9 moles of AgI with each mole of $NR_4I$ where R represents at least one lower alkyl group selected from methyl, ethyl, propyl, and butyl.

* * * * *

PO-1050
(5/69)

UNITED STATES PATENT OFFICE
CERTIFICATE OF CORRECTION

Patent No. 3,719,611    Dated March 6, 1973

Inventor(s) Leo E. Topol et al

It is certified that error appears in the above-identified patent and that said Letters Patent are hereby corrected as shown below:

Cover page under "References Cited" delete "2,944,975 7/1960 Folberth 23/204" (second instance);
Cover page under "Other Publications" should read --Jacobson: Encyclopedia of Chemical Reactions, Vol. VI, 1956, p.162.--;
Cover page under "Abstract" third line from bottom "synthesize" should read --synthesized--.
Column 1, line 10 after "formula" insert --(1)--;
Column 1, line 12 "2 $QAg_nI_{n+1}$" should read --(2) $QAg_nI_{n+1}$--.
Column 2, line 60 "2-amino-butanol" should read --2-amino-1-butanol--.

Column 5, line 26 "$N(C_2H_5)_4I.b^1\!/2AgI$" should read --$N(C_2H_5)_4I.6^1\!/2AgI$--;
Column 5, line 59 "over." should read --oven.--.
Column 6, line 12 "inclined" should read --included--;
Column 6, line 39 "is" should read --in--.

Signed and sealed this 21st day of May 1974.

(SEAL)
Attest:

EDWARD M.FLETCHER,JR.
Attesting Officer

C. MARSHALL DANN
Commissioner of Patents